United States Patent
Céspedes

(10) Patent No.: US 10,191,169 B2
(45) Date of Patent: Jan. 29, 2019

(54) DISTRIBUTED SEISMIC NODE COMPUTING

(71) Applicant: ION Geophysical Corporation, Houston, TX (US)

(72) Inventor: David A. Céspedes, Metairie, LA (US)

(73) Assignee: ION Geophysical Corporation, Houston, TX (US)

( * ) Notice: Subject to any disclaimer, the term of this patent is extended or adjusted under 35 U.S.C. 154(b) by 2 days.

(21) Appl. No.: 15/602,650

(22) Filed: May 23, 2017

(65) Prior Publication Data

US 2017/0343691 A1 Nov. 30, 2017

Related U.S. Application Data

(60) Provisional application No. 62/340,849, filed on May 24, 2016.

(51) Int. Cl.
*G01V 1/24* (2006.01)
*G01V 1/38* (2006.01)
*G01V 1/20* (2006.01)

(52) U.S. Cl.
CPC .............. *G01V 1/3808* (2013.01); *G01V 1/20* (2013.01); *G01V 1/24* (2013.01); *G01V 1/3852* (2013.01); *G01V 2200/14* (2013.01); *G01V 2210/1297* (2013.01); *G01V 2210/74* (2013.01)

(58) Field of Classification Search
CPC ...... G01V 1/24; G01V 1/3808; G01V 1/3852; G01V 1/20; G01V 2200/14; G01V 2210/74; G01V 2210/1297
USPC .......................................................... 367/20
See application file for complete search history.

(56) References Cited

U.S. PATENT DOCUMENTS

| | | |
|---|---|---|
| 5,920,828 A | 7/1999 | Norris et al. |
| 6,002,640 A | 12/1999 | Harmon et al. |
| 6,775,203 B2 | 8/2004 | Fagerås et al. |
| 8,446,797 B2 | 5/2013 | Olivier et al. |
| 9,121,969 B2 | 9/2015 | Rigsby et al. |
| 2005/0114033 A1 | 5/2005 | Ray et al. |
| 2005/0128872 A1 | 6/2005 | Valero et al. |
| 2011/0032794 A1* | 2/2011 | Rhodes ............ G01V 1/22 367/15 |

(Continued)

FOREIGN PATENT DOCUMENTS

| | | |
|---|---|---|
| EP | 2677346 A1 | 12/2013 |
| WO | 2015120461 A1 | 8/2015 |

OTHER PUBLICATIONS

International Search Report and Written Opinion dated Aug. 21, 2017 in connection with International Patent Application No. PCT/US2017/033982, 13 pages.

*Primary Examiner* — Daniel L Murphy
(74) *Attorney, Agent, or Firm* — Dorsey & Whitney LLP

(57) ABSTRACT

Seismic node systems can be configured for acquiring seismic sensor data with an array of seismic receivers or nodes deployable in a survey area, each receiver or node having a seismic sensor for acquiring the seismic sensor data, a clock, a controller and local memory. The seismic sensor can data characterize a seismic wavefield proximate the seismic receivers in the survey area. Quality control data can be generated based on the seismic sensor data and associated timing information provided by the respective clock, and incorporated into a seismic data flow for recording in the local memory.

25 Claims, 5 Drawing Sheets

(56) References Cited

U.S. PATENT DOCUMENTS

2016/0025883 A1    1/2016   Lambert et al.
2016/0033660 A1    2/2016   Olivier et al.

\* cited by examiner

DISTRIBUTED SEISMIC NODE COMPUTING

CROSS-REFERENCE TO RELATED APPLICATION

This application claims priority to U.S. Provisional Application No. 62/340,849, DISTRIBUTED SEISMIC NODE COMPUTING, filed May 24, 2016, which is incorporated by reference herein, in the entirety and for all purposes.

FIELD

The present disclosure relates generally to seismic image data, and more specifically to seismic image data for use in geophysical surveys. In particular, the disclosure relates to seismic image data processing for an array of seismic receivers or autonomous sensor nodes.

BACKGROUND

Modern geophysical exploration techniques include both land-based and marine seismic surveys. In marine surveys, a seismic research vessel typically tows a source such as an airgun array, which periodically emits acoustic pulses generated by collapsing air bubbles. The acoustic waves propagate through the water column and penetrate the seabed or ocean floor, where they are reflected from boundaries between subsurface geological formations. The reflected acoustic energy is detected by an array of seismic sensors or receivers, which generate seismic sensor data that can be processed to reconstruct the reflected wavefield and generate images of the corresponding subsurface geology.

Typically, the seismic receivers are distributed along a series of streamer lines towed behind the seismic vessel, or deployed directly onto the seabed along an ocean-bottom cable. Receivers can also be deployed as an array of individual, autonomous sensor nodes.

Within the water column, acoustic energy is substantially characterized by the propagation of pressure-type acoustic waves (P-waves). Thus, towed seismic streamer arrays traditionally utilize pressure-sensitive receivers such as hydrophones. The subsurface wavefield, on the other hand, includes both pressure waves and shear waves (S-waves), in addition to more complex wavefield contributions. Modern ocean-bottom seismic systems thus employ motion-sensitive devices such as geophones and accelerometers as well, for example in a sensor subarray with a combination of hydrophone and multi-axis geophone components, sensitive to both differential pressure and motion (velocity or acceleration) along three orthogonal axes.

In this more general approach, the pressure and shear wave contributions are combined to more accurately reproduce the full seismic wavefield, and to generate more complete images of the subsurface geology. Similar techniques can also be applied in land-based surveys, where both pressure and shear wave data are also available.

In order to accurately track and log the substantial quantities of seismic sensor data required to achieve these results, precision clock systems are typically provided, along with local data processing and storage components, a power supply, and an interface configured for control and data communications. As each of these components increase in data capacity, there is an ongoing need for improved seismic imaging techniques adapted to handle the correspondingly greater data flow.

SUMMARY

This disclosure is directed to seismic surveys and seismic data imaging. Method, system and apparatus embodiments are included.

Seismic sensor data is generally acquired with an array of seismic receivers or autonomous nodes, which are deployed into selected positions in a desired survey area. Each receiver or node includes a seismic sensor or sensor subarray configured for acquiring the seismic sensor data, for example a hydrophone sensitive to pressure variations in a water column, a geophone sensitive to velocity and acceleration (e.g., along three different axes), or both. A local clock is provided for associating the seismic sensor data with timing information, along with a controller for generating quality control data from the seismic sensor data and associated timing information, and local memory for recording the resulting data stream.

The seismic sensor data characterize a seismic wavefield in the survey area, proximate each of the seismic receivers. Portions of the data stream can be selected or prioritized for storage and offloading to a survey controller or other seismic data processing platform, based on the corresponding quality control data.

In some embodiments the quality control data characterize seismic attributes such as first break peak, hydrophone amplitude calibration, geophone amplitude calibration, shear wave leakage attenuation and pressure-velocity summation and other receiver domain qualities. For example, the quality control data can include first break information based on the seismic sensor data and associated timing information, where the first break information is indicative of a seismic impulse in the corresponding sensor data.

Selected portions of the seismic data flow can be recorded in respective local memories based on (or responsive to) the quality control information, for example where the first break information indicates a suitable seismic impulse. Other portions of the seismic data flow may be excluded from storage or recording in the local memory, absent the first break information indicating a seismic impulse. Where seismic impulses are absent for a predetermined period of time, the controller can also direct the seismic receiver or node to enter a standby (reduced power) mode.

Seismic impulses of interest include seismic shots and other naturally-occurring seismic effects. For example, the impulses can be identified based on the amplitude of a hydrophone (pressure) or geophone (velocity or acceleration) signal exceeding a given noise threshold within a particular time window, based on the associated timing information.

The seismic data flow can be retrieved from local memory and processed by a survey controller (or similar seismic data processing system), in order to generate seismic imaging data. For example, the survey controller can be configured with a display, in order to generate seismic images of the survey area. The imaging process can be optimized based on the quality control data, in order to provide improved information regarding subsurface geophysical structures in the survey area.

The quality control data can also be used to prioritize a subset of the receivers and corresponding seismic data flows for retrieval, e.g., based on the first break peak information or other seismic attribute, or using a combination of such attributes. A list of discrete time records can also be created to determine which subsets to prioritize, based on the corresponding quality control data.

The seismic receivers can also be configured to update the survey controller or process optimizer with state completion information, e.g., providing information to a survey receiver mapper responsive to generation of the quality control data in the seismic data flows. The survey optimizer or mapper can then use the state completion information to update survey state data in a survey wide data store, which in turn can be used to prioritize data flows for retrieval from the local memories on other receivers or nodes. The process optimizer can then update the survey state data and provide new input to the survey mapper, completing the optimization control loop.

System and apparatus embodiments include a plurality of seismic receivers or autonomous nodes, each having a seismic sensor or sensor subarray configured for acquiring seismic sensor data. The seismic sensor data characterizes a seismic wavefield proximate the receiver or node, when deployed in a survey area.

Local receiver or node controller hardware is configured for generating quality control data based on the seismic sensor data and associated timing information, generated by a local clock. The quality control data are combined with the seismic sensor data and associated timing information to generate a local seismic data stream for each receiver or node, and at least selected portions of the stream are recorded in local memory.

In autonomous seismic node embodiments, each node can include a seismic sensor subarray with a hydrophone and a multi-axis geophone. The clock, controller and local memory components are provided individually and independently for each node, physically distinct from the corresponding components in other nodes.

The quality control data can include seismic attributes such as first break peak, amplitude calibrations, shear wave leakage attenuation and pressure-velocity summation, e.g., to reduce ghosting in the reconstructed image data. The node controllers can be configured to prioritize a subset of the respective seismic data streams for recording and/or offloading based on any combination of these attributes. The nodes can also be configured to operate in standby mode to conserve power when no seismic impulses are indicated in the data.

A seismic survey controller can be configured to retrieve the seismic data streams from the receivers, after they are recovered from the survey area. Data retrieval can also take place while the nodes are still deployed, e.g., using an ocean bottom cable or a wireless or acoustic link. A data store and display system can be provided to display seismic images based on the processed data streams, in order to characterize geophysical structures in the survey area.

Optimizer hardware and software can also be provided to receive state completion information from the receivers, as indicative of the quality control data being generated in the seismic data stream. A survey mapper can update survey state data in the survey data store, based on the state completion information, and optimizer can prioritize the seismic data streams for retrieval based on the survey state data. The survey controller can then be configured to update the seismic imaging data in substantially real time, based on the prioritized seismic data streams, before retrieving and processing of all of the other (non-prioritized) data streams from the other nodes. In some embodiments, suitable seismic image data are provided without needing to retrieve and process the other (unselected seismic data streams), e.g., those without identified seismic shots or other relevant impulses.

DETAILED DESCRIPTION

Advanced seismic sensor data acquisition systems suitable for application with the techniques described here are available from leading providers of technology-driven solutions for the oil and gas industry, including ION Geophysical Corporation of Houston, Tex. Additional features and benefits of these systems are described in U.S. Pat. No. 6,775,203, U.S. Pat. No. 8,446,797, U.S. Pat. No. 9,121,969, U.S. patent application Ser. No. 14/774,369 (U.S. Publication No. 2016/0025883), and U.S. patent application Ser. No. 14/774,544 (U.S. Publication No. 2016/0033660), each of which is incorporated by reference herein, in the entirely and for all purposes.

In the following, reference is made to embodiments of the invention. However, it should be understood that the invention is not limited to the specific embodiments that are described. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention.

Thus, the following aspects, features, embodiments and advantages of the invention are merely illustrative, and should not be construed as elements or limitations of the appended claims except where recited therein. Likewise, references to the invention, and to particular examples and embodiments of the invention, shall not be considered to generalize features the claimed subject matter, except where those features are expressly included in the claim language.

Figure 1:
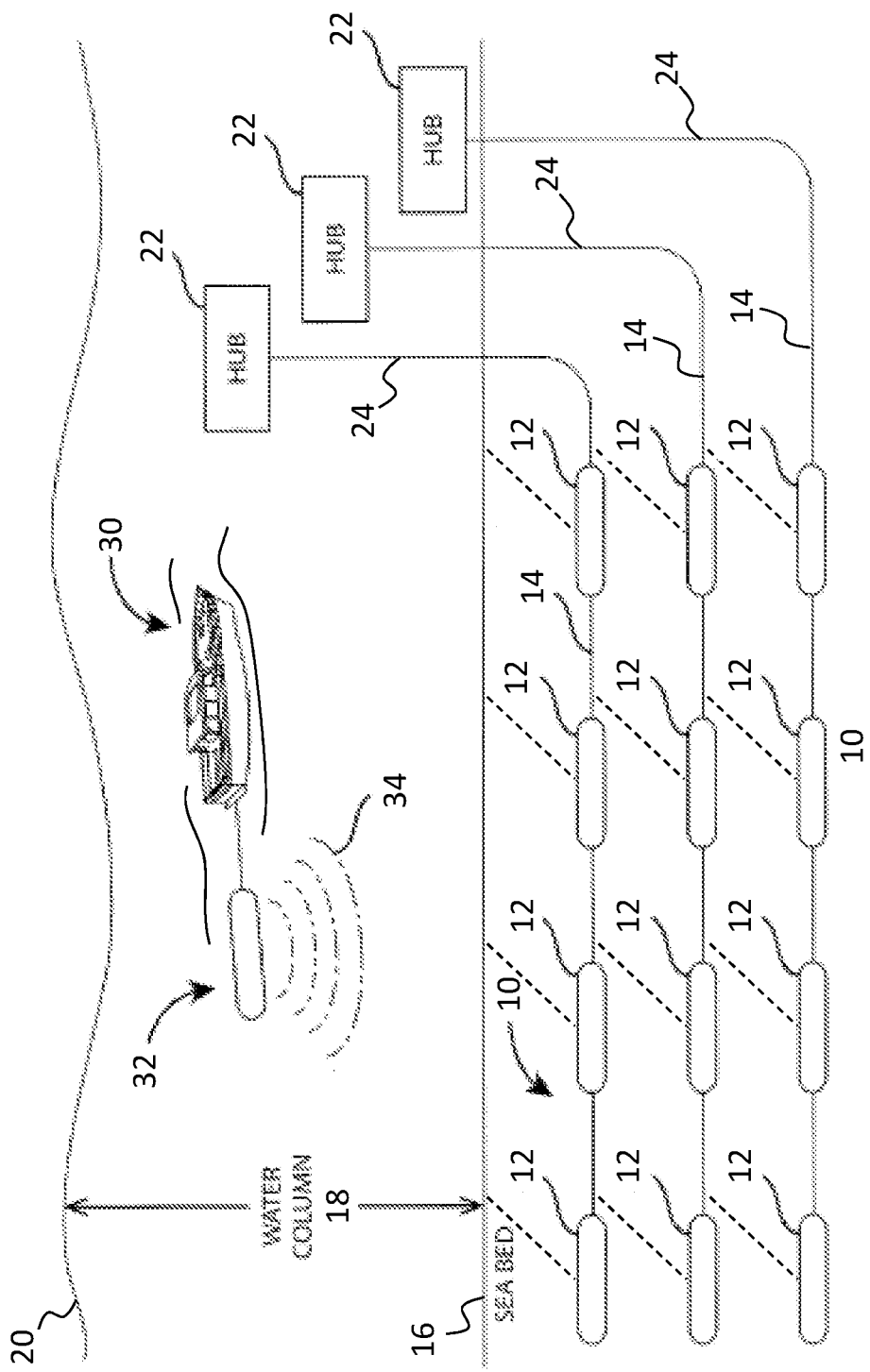
FIG. 1 is schematic illustration of a representative marine seismic array, as configured for geophysical data acquisition in an ocean-bottom cable (OBC) embodiment.

FIG. 1 is a schematic illustration of a representative marine seismic array 10 configured for geophysical data acquisition in an ocean-bottom cable (OBC) configuration. As shown in FIG. 1, a plurality of seismic receivers or sensor nodes 12 are deployed along one or more ocean-bottom cables 14, and positioned in a grid pattern (dashed lines) or other suitable geometry for data acquisition on seabed 16, below surface 20 of water column 18. Alternatively, array 10 can be configured as a group of independent, individually deployed, autonomous node-type receivers 12.

Each seismic receiver or node 12 can be configured with a combination of pressure and motion-sensitive seismic sensor devices, such as hydrophones, geophones and accelerometers, with sensitivity to both pressure and shear wave components of the seismic wavefield. In advanced seismic sensor and receiver systems, a three-axis geophone is typically provided to measure motion in three mutually orthogonal axes (e.g., velocity or acceleration along x, y and z axes), with a hydrophone or similar pressure-sensor device configured to measure the pressure component of the wavefield (e.g., a differential pressure sensor). A precision clock system can also be included, along with a power supply, communications interface, and suitable processing and data storage components.

One or more hub devices 22 can be provided with additional power supply, clock, data interface and computer processing components configured to acquire and store seismic sensor data collected by individual nodes 12. Depending on application, hub devices 22 can be deployed on surface 20 of water column 18, and connected to individual nodes 12 or ocean bottom cables 14 via power and communications links 24. Alternatively, nodes 12 and one or more hub devices 22 can be deployed together on seabed 16, or suspended at a predetermined height above seabed 16 within water column 18, or submerged at a selected depth in water column 18 below surface 20.

As shown in FIG. 1, a seismic research vessel or source boat 30 tows an air gun array or other seismic source 32 along surface 20 of water column 18. The seismic source or sources 30 periodically releases bursts of compressed air into water column 18, generating energy in the form of acoustic waves 34 that propagate toward the seabed or other bottom structure 16.

A portion of the acoustic energy 34 reflects from seabed 16, and may undergo multiple reflections between seabed 16 and surface 20 of water column 18. Another portion of the acoustic energy 34 penetrates seabed 16 and is reflected from the underlying geological structures, for example a subsurface hydrocarbon reservoir or other natural resource. The reflected energy is detected by seismic receivers or sensor nodes 12 in seismic array 10, and can be processed to generate geophysical images of the corresponding subsurface structure.

Figure 2:
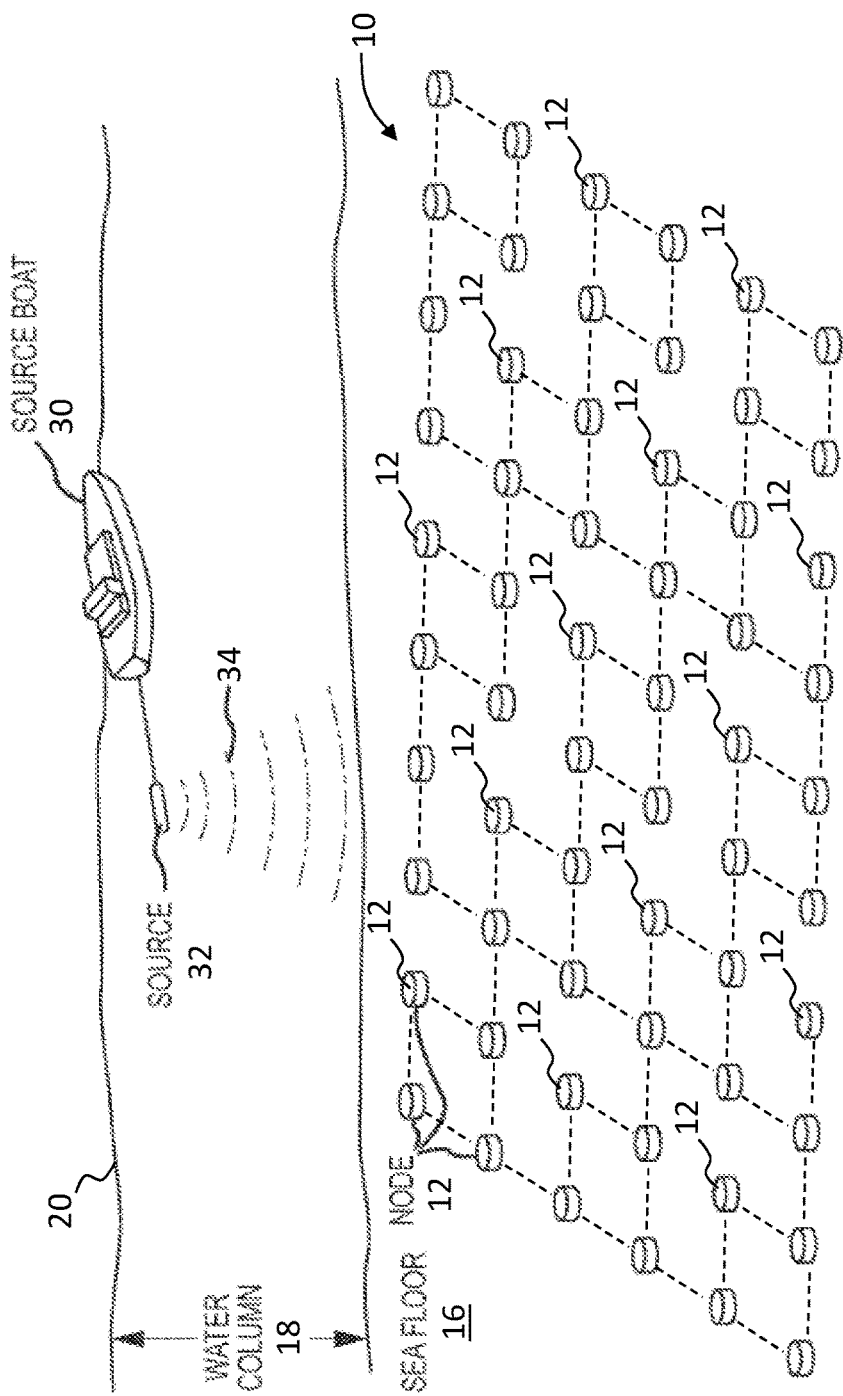
FIG. 2 is a schematic illustration of a seismic array including a plurality of autonomous sensor nodes deployed on the seabed or sea floor.

FIG. 2 is a schematic illustration of a seismic array 10 including a plurality of autonomous sensor nodes 12 deployed on the seabed or sea floor 16. The grid configuration (dashed lines) is merely representative, and can take a variety of different geometries depending on the desired sensor density, spacing, and coverage area, and on the geology or the sea floor or other survey area 16.

Depending upon application, strings of autonomous nodes 12 can be deployed from a surface vessel along one or more ropes or ocean-bottom cables, as described above, or nodes 12 can configured for individual deployment and recovery using an autonomous navigation system, or via a remotely operated vessel (ROV) or underwater autonomous vessel (UAV). Suitable seismic arrays 10 can also be deployed on the bottom surface of a lake, reservoir, river or other water column 18, or utilized in a land-based seismic survey.

Modern seismic survey systems 10 as shown in FIGS. 1 and 2 can provide substantially more advanced and accurate imaging of the subsurface geology, but they also require more data throughput, including substantially more detailed sensor data for both P-wave and S-wave components of the seismic wavefield. In order to accommodate this increased data flow, sensor nodes 12 are adapted for preprocessing the seismic sensor data to provide quality control information, which is used to optimize the survey data handling procedures. Optimizing the survey data analysis not only reduces data transmission and processing requirements, it can also provide faster, substantially improved seismic imaging results, as described herein.

Distributed Seismic Node Quality Control Processing

In order to improve imaging quality and reduce overall processing time, individual nodes 12 perform quality control and other preprocessing tasks on the acquired seismic sensor data in parallel. For example, quality control (QC) and other preprocessing can be performed after node recovery but before data offload (or upload), with individual analysis tasks split up and distributed to individual nodes 12 to speed up the quality control processing time.

Quality control analysis can also be performed while nodes 12 are connected to a recharging station, with the QC-processed data being downloaded for subsequent image processing on board the recovery vessel, or in a similar data processing environment. Depending on power, memory and processing capacity, quality control and other preprocessing tasks can also be performed after data acquisition but while nodes 12 are still deployed, or during the recovery process itself (that is, either before, during or after recharging the nodes). Alternatively, quality control analysis and other preprocessing can be performed in parallel with the data acquisition, providing for additional real-time, dynamic data optimization procedures.

Other applications include sending source shot times to individual nodes 12, for example using an onboard data connection after recovery, or via an ocean-bottom cable or using an acoustic or wireless signal sent to the deployed nodes. In these examples, individual nodes 12 can be configured to compute first break peak (FBP) values in parallel. Individual headers and other metadata can also be determined for each seismic node 12, allowing the node processors to update the seismic sensor data headers (e.g., Unix-type SU headers or other data-specific header information). The node processors can also generate additional logging data and metadata used to generate the computed first break times, in order to provide a corresponding list of discrete time-based seismic sensor data records for prioritization prior to data offload.

More generally, the local processing capacity of each individual seismic node 12 can be leveraged to provide a distributed "seismic grid" computing platform, in which physically discrete processor components in each individual node perform quality control, first break, header, and other analysis on locally collected data before the data are offloaded for final image processing. In addition to quality control and first break picking, other suitable receiver domain attributes include, but are not limited to, amplitude, energy, frequency, phase, absorption and coherency. These attributes can either be considered independently or as a function of other parameters such as offset, incidence, midpoint, etc. Taken as a whole, this "distributed seismic node" approach to quality control and other preprocessing tasks can substantially speed up ultimate image processing tasks by executing some of the analysis steps before the seismic data streams are offloaded and recovered from the individual seismic nodes 12, thus generating and delivering fully processed image data to the client more quickly than is possible with existing seismic sensor data collection techniques.

Both distributed quality control analysis and seismic node-based first break analysis (and other receiver domain attributes) are included, each utilizing onboard seismic node processors. More specifically, each seismic node 12 includes a central processing unit (CPU) or similar computer-based controller hardware, which can run the receiver domain analysis independently on the incoming data flow for each receiver or node 12, in parallel with the other seismic nodes, in order to create a list or set of preprocessed, quality controlled data. The quality control analysis can also be used to help determine which data to store and/or download, further improving imaging speed and quality by reducing offload time and avoiding additional transfer and processing of data that may not ultimately be used, or would otherwise not benefit final image quality.

The preprocessed (QC-analyzed) seismic sensor data can also include other information (e.g., headers and other metadata), which can be fed into an advanced navigational command and control system in order to compare known shot records to the first break list on each node 12. Suitable applications include Gator command and control systems, as available from ION Geophysical Corporation, The results of this process can then be used to determine which data to offload for image processing, without requiring access to additional navigational and command/control system databases. The preprocessed data could also be used to index a list of "interesting features," e.g., seismic shots generated by a seismic source and other seismic impulses of interest. In the event that no known source data was being recorded, suitable impulses of interest can also be identified based on sensor signals above a given noise threshold, within a preselected time window or over a predetermined period of time.

Quality control, first break (and other receiver domain attribute) analysis and other preprocessing tasks can be implemented via software commands stored in a non-transitory computer readable medium, where the commands are read and executed by local computer processing components on each individual seismic node 12. Alternatively, local quality control and other preprocessing steps can be executed in a field programmable gate array (FPGA), or similar hardware or firmware component provided on each seismic node 12.

In one particular example, the first break analysis capability can be added to a FPGA or other hardware or firmware configured for power management. Then, if no shots have been seen after a given timeout, the node control system can stop "waking" the CPU and issue a standby command to lower power consumption by reducing cycle rates, or not recording additional data until "good" first breaks are detected (e.g., a seismic shot or other feature of interest in the seismic sensor data, indicating that acquisition is taking place and data flow generation and recording should resume).

Figure 3:
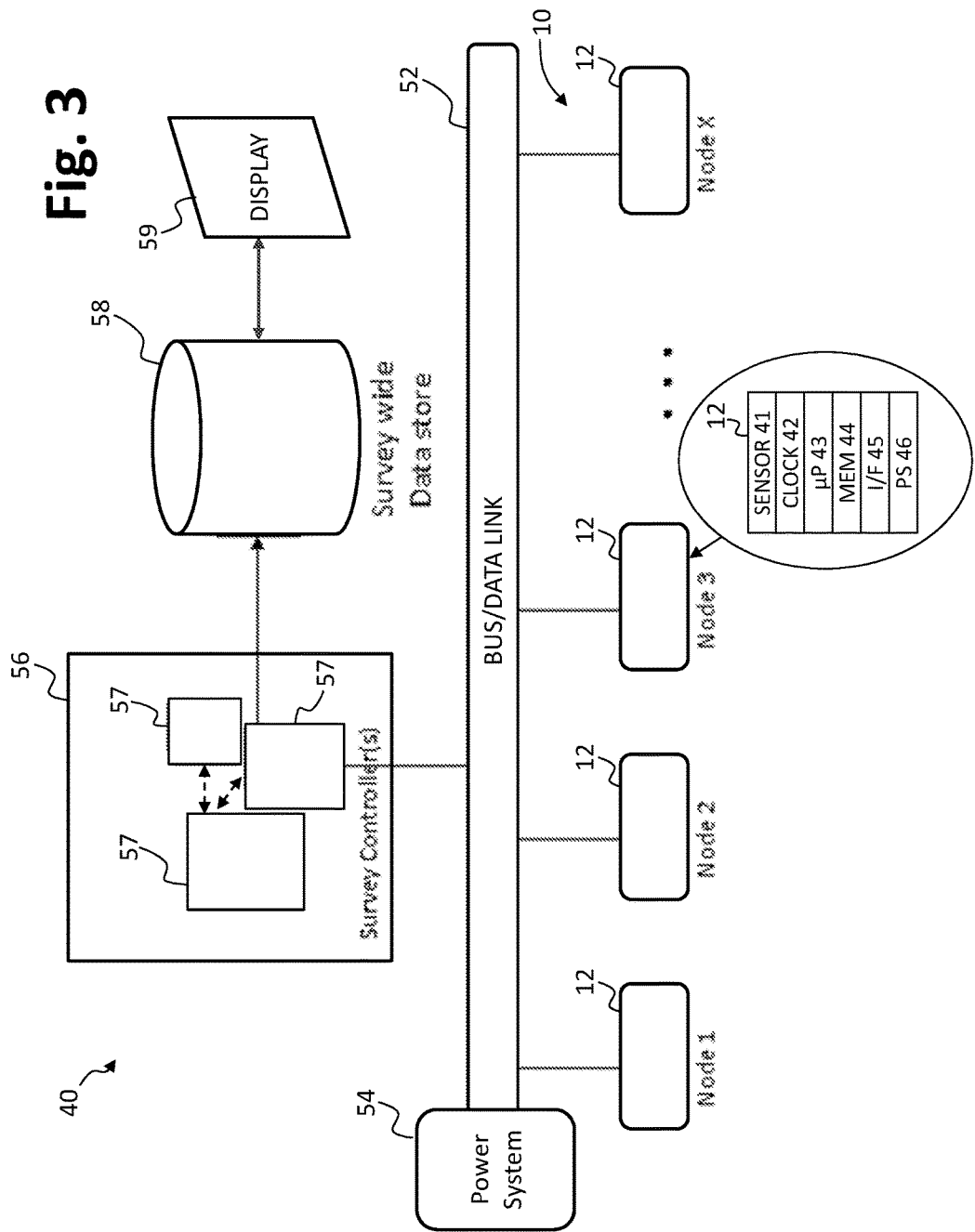
FIG. 3 is a block diagram of a distributed seismic node computing system for a plurality of seismic receivers or autonomous seismic nodes.

FIG. 3 is a block diagram of a distributed seismic node computing network or system 40 for a plurality of seismic receivers or autonomous seismic nodes 12. Seismic nodes 12 are provided in a seismic array 10, including a plurality of individual nodes $N_1, N_2, N_3 \ldots N_X$. Each seismic node 12 includes a sensor array (or subarray) 41 with one or more hydrophones, geophones or other pressure and motion-sensitive components. A local (internal or slave) clock 42 can also be provided, along with an on-board computer processor or microprocessor (μP) system 43, non-transitory memory components (MEM) 44, a wired, wireless or acoustic interface (I/F) 45, and a power supply (PS) 46, such as a rechargeable battery system.

As shown in FIG. 3, array 10 of autonomous seismic nodes 12 has been retrieved from the ocean floor (or other seismic survey location), and coupled to a data bus or link 52 configured for communication with individual nodes 12 via on-board data interfaces 45. In this configuration, a power system 54 can also be provided, in order to recharge the power supplies 46. Alternatively, nodes 12 can remain in a deployed state along an ocean bottom-cable, which is configured to performing the functions of data bus or link 52. An acoustic or wireless communication link 52 can also be used.

A survey controller 56 is provided in data communication with individual nodes 12 via data link 52 and on-board interfaces 45, for example using a cluster of individual survey control processors 57. Survey controller 56 communicates with a survey-wide non-volatile memory system or data store 58. An interactive display system 59 can also be provided.

Survey data store 58 is configured to store survey data including the seismic data flows generated by individual seismic nodes 12, with seismic sensor data acquired by sensor subarrays 41 and associated timing information from local clocks 42. Quality control data and other preprocessing information are also included, as generated by distributed seismic node processors or controllers 43.

Survey data store 58 also stores geophysical imaging data generated by survey controller 56, and survey management database information including known shot records, master clock times, navigational data, and survey command and control information. Interactive display system 59 is configured to present the processed seismic imaging data via a graphical user interface, in order to characterize the subsurface geophysical structures of interest in the survey area.

Depending on application, the seismic sensor data, clock information, and quality control data (including first break peak information) generated by each individual seismic node 12 can be recorded on local memory components 44 prior to communication to survey controller 56. Data retrieval to the survey controller can take place after recovery of the receivers or nodes 12 from the survey location, or in real time during seismic data acquisition. Alternatively, selected portions of the local seismic data flow streams can also be communicated in substantially real time, as the seismic data are generated, for example using an ocean-bottom cable or other communications link to an array 10 of nodes or receivers 12 deployed in a survey area.

Autonomous Data Acquisition and Analysis

Autonomous seismic recording systems (or nodes) 12 provide data management, communication and software application infrastructure for process, analysis and control of data flows in distributed computing network 40.

One step in the seismic acquisition process is recording of data during an active survey, using sensor subarrays 41 to provide data that is time-stamped with timing information from local clocks 42. In the case of an array 10 of autonomous nodes 12, the sensor and clock data are typically kept in local mass storage volumes, or similar memory components 44. Real-time control communications can be provided via local interface 45 (e.g., over an ocean-bottom cable or using an acoustic interface), with power provided by the battery pack or other power supply 46.

When seismic array 10 is retrieved, each individual seismic node or receiver device 12 can contain a complete set of raw seismic samples and clock signals for a given receiver point, corresponding to the node location in the survey grid. Individual seismic nodes 12 are connected within distributed network 40 via a hardware data link 52 provided on board the recovery vessel, or in a similar (e.g., land or marine-based) processing network 40. Alternatively, distributed data preprocessing can take place on local controllers 43 with seismic array 10 still deployed in the survey grid, either during seismic sensor data acquisition or following acquisition but before node recovery.

Seismic data flow process command and control is managed by a survey controller 56, or a cluster of survey control processors 57. Seismic sensor data processing commands are assigned by controller 56 and distributed to individual seismic nodes 12 via data link 52, in order to compute seismic attributes and analyze the raw seismic sensor data using individual on-board processors/controllers 43, prior to downloading the preprocessed data to survey-wide central data store 58.

In general, distributed seismic node computing system 40 is configured to speed up the aggregated seismic processing workflow by performing local quality control checks on seismic nodes 12, prior to data transfer over link 52. System 40 also improves the seismic imaging process by performing first break picking and other receiver domain attribute analysis in parallel on individual receivers or nodes 12, in combination with quality control and other metadata processing steps performed independently on the data generated by each local seismic sensor subarray 41, using local controllers 43 and other on-board, receiver-based computer processor components.

The focus of system 40 is on an approach that uses a "survey aware" processing controller 56, which distributes process flow commands over data link 52 to provide logical data flow mapping information to the autonomous seismic nodes 12 in array 10, so that on-board controllers 43 can begin local analysis of the corresponding seismic samples, including and metadata preprocessing on the raw sensor and clock data headers. The result is a parallel and distributed seismic analysis system 40, which can produce improved metadata and quality control information including first break peaks and other seismic data attributes locally on individual nodes 12, prior to incorporation into the collection of seismic records over data link 52.

Figure 4:
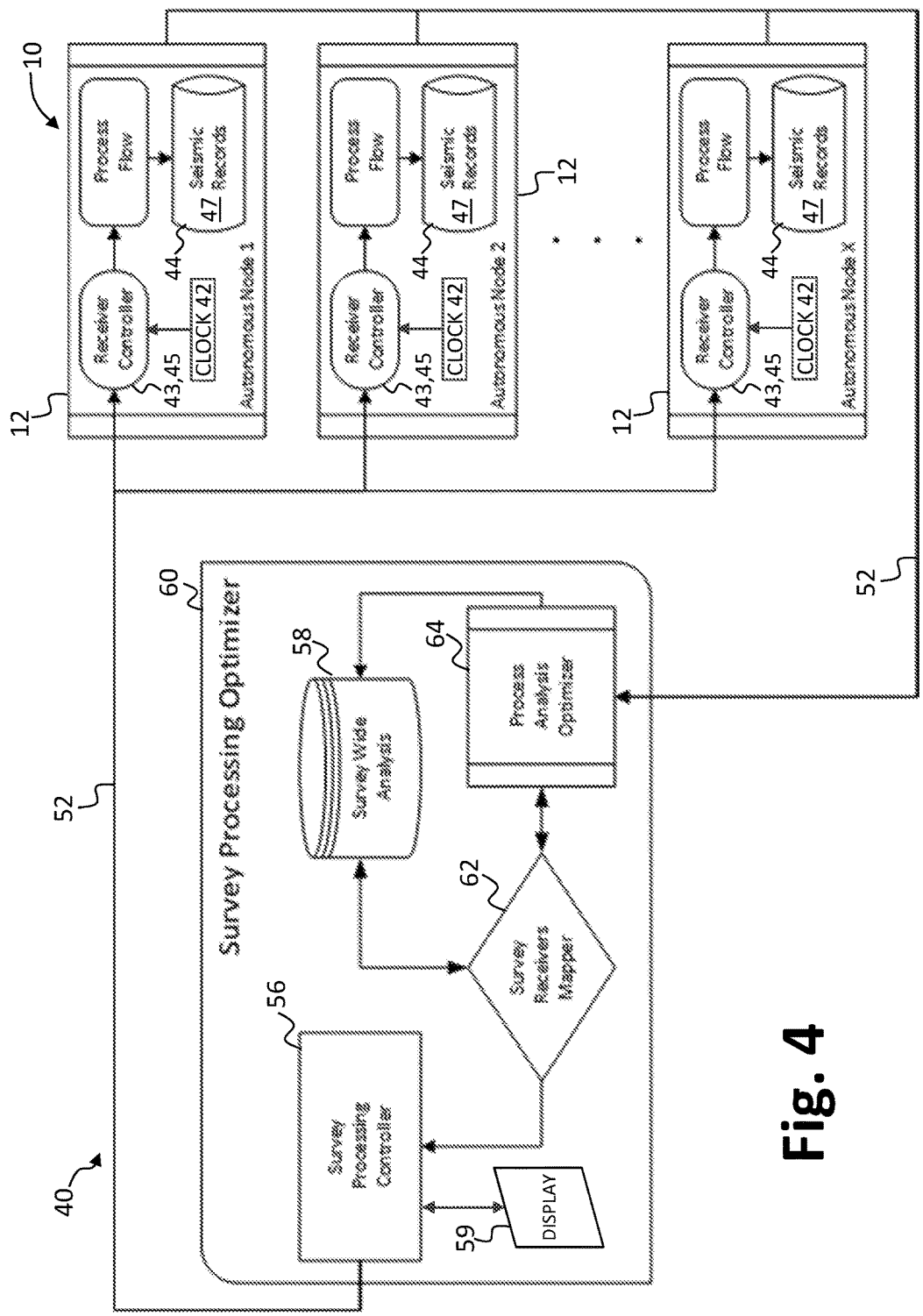
FIG. 4 is a block diagram of a seismic survey data processing optimizer for a distributed seismic survey data processing network.

FIG. 4 is a block diagram of a seismic survey data processing optimizer 60 for distributed seismic processing network 40. Survey process optimizer 60 includes a survey controller 56 and survey data store 58, along with a survey receiver mapper 62 and process analysis optimizer 64. Survey process optimizer 60 is provided in data communication with an array 10 of seismic receiver nodes 12, either via a hardware data link 52 or ocean-bottom cable, or using wireless or acoustic communications, as described above.

As shown in FIG. 4, survey process optimizer 60 can incorporate advanced hardware and customized software components, including a survey receiver mapper 62 and an events and active analysis optimizer 64, which cooperate with survey controller 56 to manage the seismic imaging data flow to and from autonomous seismic nodes 12 over data link 52, and to provide command and control information to individual receiver controllers 43, e.g., via local communication interfaces 45.

Local receiver controllers (or node controllers) 43 are configured to manage the process flow of seismic sensor data 47 recorded in local memory components 44, with periodic updates of state completions to a topside analysis optimizer 64 within survey process optimizer 60. Analysis optimizer 64 updates the survey state data, and provides new input to the survey receiver mapper 62, completing the optimization control loop.

Autonomous Process Flows

Within these control flows a seismic grid computing platform is provided with distributed process flow data 47 for seismic sensor data obtained by each individual autonomous node 12. This platform can be used in parallel computation of seismic attributes associated within the common receivers' domain. Suitable seismic attributes include, but are not limited to:

First Break Peaks (FBPs),
Overall hydrophone/geophone amplitude calibration,
Shear wave leakage attenuation; and
P-Z or pressure-velocity summation (e.g., vertical velocity).

In the advanced seismic image data processing scheme described here, these individual analyses are performed at least partially within each individual seismic node 12, including analyses performed via node-based data quality control testing and attribute parameter fine-tuning. Within a given control loop, these processes can be initiated with a set of default or rough estimate parameters, in order to obtain a zeroth-order product to accomplish initial quality control objectives. Iteration of the control loop is performed to achieve finer (second order and higher order) results.

Generation of the relevant seismic attributes using local processing capacity on board each physically distinct autonomous seismic node 12 can also be used to parse and prioritize the initial seismic recorder data stream or flow 47, in order to create a list of discrete time records to help determine which partial dataset range or ranges should be retrieved from local memory 44 for more in-depth analysis, prior to final and complete offloading of the entire set of seismic data flows 47. Thus, the computational power of the array 10 of autonomous nodes 12 can be leveraged to obtain and deliver processed, QC-analyzed seismic imaging data much more quickly than in previous designs, where the initial (raw) data is simply stored locally and then offloaded to a processing system, without the advantages of parallel processing using local controllers 43 on each individual seismic receiver or node 12.

Complete independent data flows are also encompassed, including a dynamic analysis of first break peaks as determined for seismic sensor data obtained in each individual node 12. Dynamic first break peak (FBP) information can be fed into the survey management system or process controller 56, in order to compare known shot event records to the first break list on each node 12. The FBP information can also be used to determine which subsets of seismic sensor data in each local process flow 47 to offload from memory 44, without requiring direct access by individual nodes 12 to information in the survey management databases, or the corresponding survey-wide analysis and data store 58.

A dynamic first break peak analysis can also be incorporated into each autonomous node 12 using a rolling data window to detect source event peaks, providing a histogram of incident data. Each seismic node 12 can use this information in twofold applications.

First, a power management system can be provided for execution in the local controller 43 of each deployed node 12, where the power management protocol depends on the FBP analysis. If no shots have been observed in the FBP analysis after a given time period, controllers 43 can slow down or stop processor tasks to save power in a low power mode, then wake the processor and initiate data recording when one or more FBPs are detected. Additionally, as a complement to the distributed FBP analysis performed by recovered nodes 12, a dynamic FBP can also be performed on the deployed or recovered nodes to expedite the computation of new FBP sets, as requested by the survey controller 56, e.g., via a communicated list of event times.

Survey Process Optimization

Figure 5:
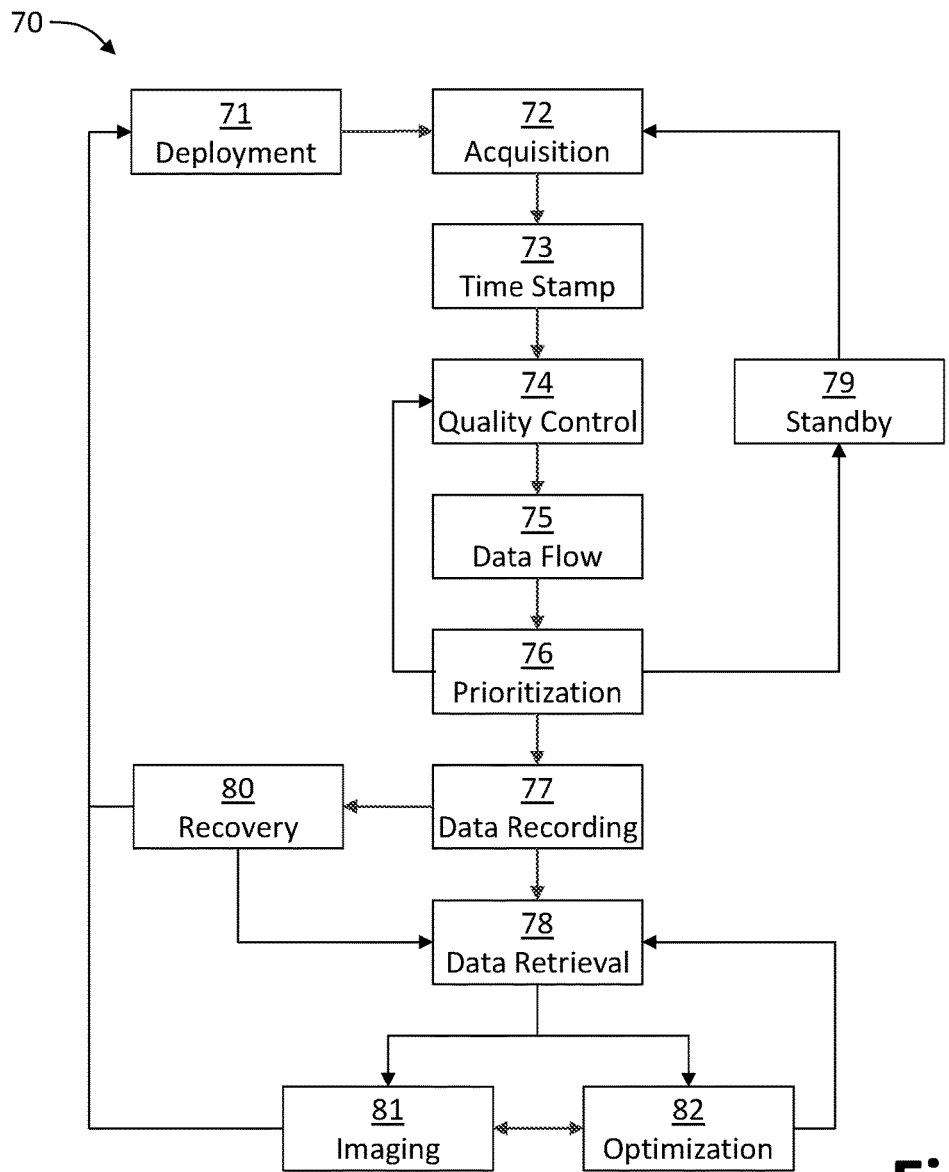
FIG. 5 is a block diagram illustrating a method for performing a seismic survey utilizing a plurality of seismic receivers or autonomous sensor nodes.

FIG. 5 is a block diagram illustrating a method 70 for performing a seismic survey utilizing a plurality of seismic receivers or autonomous sensor nodes, as described herein. As shown in FIG. 5, method 70 encompasses one or more steps including, but not limited to, deployment (step 71), data acquisition (step 72), time stamping (step 73), quality control (step 74), data flow (step 75) prioritization (step 76), data recording (step 77), data retrieval (step 78), standby operation (step 79), sensor recovery (step 80), image processing (step 81) and survey optimization (step 82). Individual method steps 71-82 can be performed in any order or combination, and repeated as desired.

Deployment (step 71) encompasses placing the seismic receivers or nodes in selected positions within a survey area, for example along one or more ocean bottom cables deployed by a seismic vessel, or in an array of autonomous seismic nodes. In marine surveys, the nodes are typically distributed along the ocean floor or seabed, but seismic receivers can also be deployed for land-based seismic surveys, or towed behind a surface vessel along a series of streamers, as known in the art.

Data acquisition (step 72) encompasses acquiring seismic sensor data with an array of seismic nodes or receivers deployed in the survey area. Each receiver or node includes a seismic sensor or sensor subarray configured for acquiring the seismic sensor data, along with a local clock, controller and memory components.

The seismic sensor data characterize a seismic wavefield in the survey area, sampled proximate each of the seismic receivers or nodes by the respective sensor subarrays. In autonomous node embodiments, for example, the sensor subarray can include both pressure-sensitive devices such as hydrophones or other differential pressure sensors, and motion-sensitive devices such as a three-axis geophone or accelerometer.

Time stamping (step 73) encompasses associating the seismic sensor data with timing information from the respective local clock. Typically, the local clocks are synchronized with a master clock prior to deployment, but synchronization signals can also be provided to deployed nodes, either before or during seismic data acquisition.

Quality control (step 74) encompasses generating quality control data and other metadata for the sensor data acquired by each seismic receiver or node. The quality control data are generated by the local controllers, based on the respective sensor data acquired by the seismic sensor subarray, and the associated timing information provided by the local clock.

The quality control data typically include seismic attributes based on the seismic sensor data and associated timing information, including, but not limited to, first break peak, amplitude calibrations for the hydrophone and geophone sensors, shear wave leakage and attenuation information, and pressure-velocity summation data (e.g., P-Z data used to reduce ghosting in the processed image data, based on differences in the vertical velocity components of the upgoing and downgoing seismic wavefield). In one particular example, the quality control data include first break information indicative of a seismic impulse in the seismic sensor data, for example an impulse due to a seismic shot or other seismic event of interest.

Additional metadata can also be provided as part of the quality control procedure, including updated seismic sensor data headers (e.g., Unix-type SU headers or other data-specific header information), and logging data or metadata used to generate the computed first break times and to provide a corresponding list of discrete, time-based seismic sensor data records. The additional metadata can be used to prioritize the local seismic data flows for storage and uploading or offloading, as described below.

Generating a seismic data flow (step 75) encompasses combining the quality control data with the seismic sensor data and associated timing information for recording in local memory. In general, each local seismic data flow (or node-based seismic data stream) can include all of the respective quality control data, raw seismic sensor data and associated timing information, and all of this data may ultimately be retrieved. The data recording and retrieval processes can also be prioritized based on the quality control data, as described below.

Prioritization (step 76) encompasses identifying selected portions of the seismic data flow for recording in local memory (step 77) and/or retrieval (step 78), based on the quality control data. For example, selected portions of the data flow can be recorded in response to the first break information indicating a seismic impulse in the seismic sensor data. Subsets of the seismic data flow can also be prioritized for retrieval by the survey controller (step 78), based on the first break peak information or other quality control data.

In some applications, a list of discrete time records can be created to determine which subsets of the seismic data flow should be prioritized for storage or retrieval (or both), based on the quality control data, the seismic sensor data and the associated timing information. For example, the quality control data may include metadata such as seismic sensor data headers and logging data, which is generated as part of the local seismic data flow and can be used to help generate the first break peak information for the list of discrete time records. Alternatively, such a list can be generated based on other seismic attributes, as described above.

Data recording (step 77) encompasses recording at least selected portions of the data flow in local memory. Other portions of the may also be recorded, even if they are not selected or flagged based on the quality control data, for example in a different area of the local memory, or together with the rest of the data flow. Alternatively, unselected portions of the data flow can be excluded from recording altogether, for example if the first break information does not indicate a suitable seismic impulse, and none of the other quality control data indicate that that the corresponding data should be retained.

Data retrieval (step 78) encompasses retrieving at least selected portions of the recorded seismic data flows from local memory in the seismic receivers. The other (unselected or lower-priority) portions of the data flow can either be retrieved later, or not at all, e.g., if no seismic shot or other impulse of interest is indicated.

Typically, retrieval is performed after recovery of the seismic receivers or nodes from the survey area (step 80), for example using a data bus or similar data link to a survey controller or other customized optimizer hardware and software on board the recovery vessel. The data retrieval system can also be configured to recharge the power supplies, update the control software, and provide other servicing functions.

Alternatively, data can be retrieved while the devices are still deployed, e.g., using an ocean-bottom cable data link, or via a wireless or acoustic link. Data offloading and receiver servicing can also be accomplished with a remotely operated vessel (ROV) or underwater autonomous vessel (UAV).

Standby operation (step 79) encompasses operating the seismic receiver or node in a reduced-power mode, for example in response to the absence of a seismic impulse of interest in the seismic data flow. Suitable standby indicators include the lack of any seismic sensor signal amplitude exceeding a given noise threshold within a preselected time window, or for a predefined time, and other indicators that no seismic shots or other events of interest have been observed over the predefined window.

Absent a suitable impulse, the local controller can generate a timeout signal to stop "waking" the CPU, no longer generating a seismic data flow (step 75) or recording the data flow in local memory (step 77). The controller can also be configured to exit from standby mode when a good first break or other impulse of interest is detected in the seismic data flow. The controller can then direct the receiver or node electronics to leave standby mode, indicating that seismic survey data acquisition (step 72) is taking place and resuming time stamping (73), quality control (step 74), seismic data flow generation (step 75), prioritization (step 76), and recording (step 77).

Recovery (step 80) encompasses recovering the nodes from the survey area. In surface vessel operation, the receivers can be deployed and retrieved along an ocean bottom cable, or as autonomous nodes distributed along a rope or wire. Individual receivers and nodes can also be deployed and recovered with a remotely operated vessel (ROV) or an underwater autonomous vessel (UAV), or via autonomous on-board navigation and recovery systems.

Imaging (step 81) encompasses processing the retrieved seismic data flows to generate seismic images of the survey area, based on the corresponding seismic sensor data and associated timing information, and the quality control data. Imaging can be performed by either the survey controller, or by other components of the survey optimizer system. An interactive display system can also be included, and configured for presenting the processed seismic imaging data in order to illustrate the subsurface geophysical structures of interest, in the selected survey area.

Optimization (step 82) encompasses tailoring the data recovery process to reduce overall data transfer and processing times, while improving image quality. For example, a survey processing optimizer or process analysis optimizer can be used to update state completion information from the local controllers on the individual seismic receivers. The state completion information can characterize the generation of quality control data by the individual nodes, and indicate completion of discrete time records and other elements of the seismic data flow stream.

A survey receiver mapper can also be provided to improve optimization, for example by updating the survey state data in the survey-wide data store, based on the state completion information. This allows the survey controller to prioritize one or more of the seismic receivers for retrieving additional seismic data streams, based on the survey state data. The prioritized data streams, in turn, can be identified based on the corresponding quality control data, in order to improve seismic imaging in real time, without requiring final and complete offloading of the entire set of recorded seismic data flows from every receiver or node. The process optimizer can then update the survey state data and provide new input to the survey mapper, closing the optimization control loop.

EXAMPLES

Seismic survey methods can be employed according to any of the above examples and embodiments, for example comprising one or more of: acquiring seismic sensor data with an array of seismic receivers deployed in a survey area, each seismic receiver comprising a seismic sensor for acquiring the seismic sensor data, a clock, a controller and local memory, wherein the seismic sensor data characterize a seismic wavefield proximate the respective seismic receivers in the survey area; associating the seismic sensor data with timing information from the respective clocks; generating quality control data for the seismic sensor data acquired by each seismic receiver, the quality control data generated by the controllers based on the respective seismic sensor data and associated timing information; and generating a seismic data flow for recording in the local memory of each of the seismic receivers, each seismic data flow comprising the respective quality control data, seismic sensor data and associated timing information.

The quality control data may comprise one or more receiver domain attributes generated by the controllers from the seismic sensor data and associated timing information. The one or more receiver domain attributes can be selected from first break peak, hydrophone amplitude calibration, geophone amplitude calibration, shear wave leakage attenuation and pressure-velocity summation. The quality control data may also comprise first break information generated at least in part from the seismic sensor data and associated timing information, the first break information indicative of one or more seismic impulses observed by the respective seismic sensors.

Suitable methods may further comprise one or more of recording selected portions of each seismic data flow in the respective local memory in response to the first break information indicating the seismic impulse, and excluding other portions of each seismic data flow from recording in the respective local memory absent the first break information indicating the seismic impulse.

The seismic impulse can be indicated based on an amplitude of a seismic signal in the seismic sensor data exceeding a noise threshold within a preselected time window, based on the associated timing information. The seismic receivers may be configured for entering a standby mode absent the first break information indicating such a seismic impulse over a predetermined time window.

The methods may further comprise one or more of: retrieving the seismic data flows from the local memory in each seismic receiver for seismic imaging by a survey controller, e.g., where the survey controller is configured to generate seismic images of the survey area based on the retrieved seismic data flows; prioritizing a subset of the seismic data flows for retrieval to the survey controller, based on the quality control data; and creating a list of discrete time records to determine the subset of the seismic data flows prioritized for retrieval from the local memory for seismic imaging by the survey controller, e.g., based on the quality control data.

The quality control data may comprise metadata selected from seismic sensor data headers and logging data, e.g., using the metadata to generate first break peak information for the list of discrete time records. The seismic receivers can be configured for updating a survey process optimizer with state completion information responsive to generation of the quality control data in the seismic data flows, e.g., where the survey process optimizer updates survey state data in a survey-wide data store based on the state completion information.

Seismic sensor data collection systems can be provided according to any of the above examples and embodiments, for example comprising a plurality of seismic receivers, each seismic receiver having one or more of: a seismic sensor configured for acquiring seismic sensor data characterizing a seismic wavefield proximate the seismic receiver, when deployed in a survey area; a clock configured for associating the seismic sensor data with timing information; a controller configured for generating quality control data based on the seismic sensor data and associated timing information; and local memory configured for recording at least selected portions of a seismic data stream comprising the quality control data, the seismic sensor data and the associated timing information.

The quality control data may comprise one or more seismic receiver domain attributes characterizing the respective seismic sensor data and associated timing information. The controllers can be configured to prioritize a subset of each respective seismic data stream for offloading, based on the one or more seismic receiver domain attributes.

The quality control data may comprise one or more seismic attributes of the respective seismic sensor data and associated timing information, e.g., with the one or more seismic attributes selected from first break peak, amplitude calibration of the hydrophone, amplitude calibration of the geophone, shear wave leakage attenuation, pressure-velocity summation and other seismic receiver domain attributes.

The seismic receivers may comprise autonomous seismic nodes each having a seismic sensor subarray comprising a hydrophone and a multi-axis geophone, e.g., where the clock, controller and local memory are provided individually for each autonomous seismic node, distinct from others of the autonomous seismic nodes.

The controllers can be configured to prioritize the subset of the respective seismic data stream for offloading based on a list of discrete time records generated from one or more of the quality control data, the seismic sensor data and the associated timing information. The quality control data may comprise metadata used to or selected to generate first break information indicative of a seismic impulse in the seismic sensor data corresponding to the discrete time records.

The selected portions of the seismic data stream can be recorded in the respective local memory in response to the first break information indicating the seismic impulse, e.g., where other portions of the seismic data stream are excluded from recording in the local memory absent the first break information indicating one or more of such seismic impulses. The controllers can be configured for the seismic receivers to operate in a standby mode, absent the first break information indicating such a seismic impulse within a preselected time window.

A seismic survey controller can be configured for retrieving the seismic data streams from the seismic receivers, e.g., with a survey data store configured for storing seismic imaging data generated thereby. A display system can be configured for displaying the seismic imaging data, e.g., where the displayed seismic imaging data characterize subsurface geophysical structures in the survey area.

A survey process optimizer can be configured to receive state completion information from the seismic receivers, e.g., with the state completion information indicative of the quality control data being generated in the seismic data streams. A survey mapper can be configured to update survey state data in the survey data store based on the state completion information, e.g., where the seismic survey controller is configured to prioritize a subset of the seismic receivers for retrieving the seismic data streams, based on the survey state data. The seismic survey controller can be further configured to update the seismic imaging data based on the seismic data streams retrieved from the prioritized subset of seismic receivers, e.g., prior to complete retrieval of all the seismic data streams from each seismic receiver.

An apparatus comprising a plurality of autonomous seismic nodes can thus be provided, for example with each of the autonomous seismic nodes comprising one or more of: a seismic sensor subarray comprising a hydrophone and a multi-axis geophone configured for acquiring seismic sensor data characterizing a seismic wavefield proximate the seismic node, e.g., when deployed in a seismic survey; a local clock configured for associating the seismic sensor data with timing information; a node controller configured for generating a seismic data stream including the seismic sensor data and associated timing information in combination with quality control data generated therefrom; and local memory configured for recording at least selected portions of the seismic data stream based on the quality control data.

The quality control data may comprise one or more receiver domain attributes generated by the node controller based on the respective seismic sensor data and associated timing information. The one or more receiver domain attributes may comprise first break peak information indicative of seismic impulses observed by the respective seismic sensor subarray.

The node controller can be configured to record the selected portions of the seismic data stream in the local memory, e.g., responsive to the first break peak information indicating the seismic impulse, and to exclude other portions of the seismic data stream from storage in the local memory, e.g., absent the first break peak information indicating the seismic impulse.

The node controller can be configured to prioritize the selected portions of the seismic data stream for offloading via a data link in communication with the plurality of autonomous seismic nodes based on the one or more receiver domain attributes, e.g., via one or more of a data bus, an ocean-bottom cable, a wireless data link and an acoustic data link. The quality control data can comprise metadata used to create a list of discrete time records associated with the selected portions of the seismic data stream, e.g., that are prioritized for retrieval from the local memory. The quality control data can further comprise one or more seismic attributes based on the seismic sensor data and associated timing information, e.g., with the one or more seismic attributes selected from amplitude calibration of the hydrophone, amplitude calibration of the geophone, shear wave leakage attenuation and pressure-velocity summation of the seismic sensor data.

ADDITIONAL EXAMPLES

Suitable system and apparatus embodiments may include a plurality of seismic receivers or autonomous nodes, each having a seismic sensor or sensor subarray configured for acquiring seismic sensor data. The seismic sensor data characterize the seismic wavefield proximate the receiver or node, when deployed in a survey area.

The local receiver or node controller can be configured to generate first break peaks and other quality control data based on the seismic sensor data, along with associated timing information generated by the local clock. The quality control data can be combined with the seismic sensor data and associated timing information to generate a local seismic data stream for each receiver or node, and selected portions of the stream can be recorded in local memory.

The node controllers can be configured to prioritize one or more subsets of the respective seismic data streams for offloading, e.g., based on the quality control data and associated timing information. For example, portions of the data stream can be prioritized based on a list of discrete time records generated from the quality control data, together with the associated seismic sensor data and timing information.

The quality control data can include attributes of the seismic sensor data, for example first break peak, amplitude calibration of the hydrophone or geophone, shear wave leakage attenuation, and pressure-velocity summation. In particular embodiments, the quality control data can include first break peak information indicative of a seismic shot or other impulse in the seismic sensor data.

Selected portions of the seismic data stream may be recorded in the respective local memories, e.g., in response to the first break information indicating such a seismic impulse, while other portions may be excluded, absent a suitable impulse. The controller can also be configured to operate the seismic receiver or node in a reduced power standby mode, e.g., if the first break information does not indicate a seismic impulse within a preselected time window.

A seismic survey controller can be configured for retrieving the seismic data streams from individual seismic nodes, either after recovery from the survey area, or while the nodes are still deployed. The survey controller can include or be coupled to a survey data store, configured for storing seismic imaging data generated from the seismic data streams retrieved from the nodes. A display system can also be provided for displaying the seismic imaging data to characterize subsurface geology in the survey area, based on the imaging data.

A survey process optimizer can receive state completion information from the seismic receivers, where the state completion information is indicative of the quality control data being generated in the seismic data stream. A survey mapper can be used to update survey state data in the survey data store, based on the state completion information, and the survey controller can prioritize the seismic receivers for retrieving selected seismic data streams based on the survey state data. The survey controller can also be configured to update the seismic imaging data in substantially real time, based on the seismic data streams retrieved from the prioritized seismic receivers, improving imaging quality based on the addition of selected data streams without having to process every data stream from all the receivers or nodes.

The local node controllers may be configured to prioritize selected portions of the seismic data stream for offloading, based on the first break peaks or other quality control data. Offloading can take place via a hardware data link on the recovery ship, or using an ocean-bottom cable a wireless data link, or an acoustic transceiver.

The local node controllers can also be configured to record selected portions of the seismic data stream in the local memory when the first break peak information indicates a suitable seismic impulse, and to exclude other portions when the first break peak information does not indicate a suitable impulse. The quality control data can include one or more additional attributes based on the seismic sensor data, for example amplitude calibration of the hydrophone or geophone, shear wave leakage or attenuation information, or combined sensor values such as a pressure-velocity sum used to reduce ghosting effects in the final image.

While this disclosure is made with reference to exemplary embodiments, it is will be understood by those skilled in the art that various changes may be made and equivalents can be substituted to adapt these teachings to different technical problems, materials and solutions, while remaining within the spirit and scope of the invention. The invention is thus not limited to the particular examples that are disclosed, but instead encompasses all the embodiments falling within the scope of the appended claims.

The invention claimed is:

1. A seismic survey method comprising:
   acquiring seismic sensor data with an array of seismic receivers deployed in a survey area, each seismic receiver comprising a seismic sensor for acquiring the seismic sensor data, a clock, a local controller and local memory, wherein the seismic sensor data characterize a seismic wavefield proximate the respective seismic receivers in the survey area;
   associating the seismic sensor data with timing information from the respective clocks;
   generating quality control data for the seismic sensor data acquired by each seismic receiver, the quality control data generated by the local controllers on each seismic receiver based on the respective seismic sensor data and associated timing information; and
   generating a seismic data flow for recording in the local memory of each of the seismic receivers, each seismic data flow comprising the quality control data generated by the respective local controller, the seismic sensor data and the associated timing information.

2. The method of claim 1, wherein the quality control data comprise one or more receiver domain attributes generated by the local controllers from the respective seismic sensor data and associated timing information.

3. The method of claim 2, wherein the one or more receiver domain attributes are selected from first break peak, hydrophone amplitude calibration, geophone amplitude calibration, shear wave leakage attenuation and pressure-velocity summation.

4. The method of claim 1, wherein the quality control data comprise first break information generated at least in part from the seismic sensor data and associated timing information, the first break information indicative of one or more seismic impulses observed by the respective seismic sensors.

5. The method of claim 4, further comprising one or more of:
   recording selected portions of each seismic data flow in the respective local memory in response to the first break information indicating the seismic impulse; and
   excluding other portions of each seismic data flow from recording in the respective local memory absent the first break information indicating the seismic impulse.

6. The method of claim 5, further comprising indicating the seismic impulse based on an amplitude of a seismic signal in the seismic sensor data exceeding a noise threshold within a preselected time window, based on the associated timing information.

7. The method of claim 6, wherein the seismic receivers enter a standby mode absent the first break information indicating such a seismic impulse over a predetermined time window.

8. The method of claim 1, further comprising one or more of:
   retrieving the seismic data flows from the local memory in each seismic receiver for seismic imaging by a survey controller, wherein the survey controller is configured to generate seismic images of the survey area based on the retrieved seismic data flows;
   prioritizing a subset of the seismic data flows for retrieval to the survey controller, based on the quality control data; and
   creating a list of discrete time records to determine the subset of the seismic data flows prioritized for retrieval from the local memory for seismic imaging by the survey controller, based on the quality control data.

9. The method of claim 1, wherein the quality control data comprise metadata selected from seismic sensor data headers and logging data, and further comprising using the metadata to generate first break peak information for the list of discrete time records.

10. The method of claim 1, further comprising the seismic receivers updating a survey process optimizer with state completion information responsive to generation of the quality control data in the seismic data flows, wherein the survey process optimizer updates survey state data in a survey-wide data store based on the state completion information.

11. A seismic sensor data collection system comprising a plurality of seismic receivers, each seismic receiver having:
a seismic sensor configured for acquiring seismic sensor data characterizing a seismic wavefield proximate the seismic receiver, when deployed in a survey area;
a clock configured for associating the seismic sensor data with timing information;
a local controller on each seismic sensor configured for generating quality control data based on the respective seismic sensor data and associated timing information; and
local memory on each seismic sensor configured for recording at least selected portions of a seismic data stream comprising the quality control data generated by the respective local controller, the seismic sensor data and the associated timing information.

12. The system of claim 11, wherein the quality control data comprise one or more seismic receiver domain attributes characterizing the respective seismic sensor data and associated timing information.

13. The system of claim 12, wherein the local controllers are configured to prioritize a subset of each respective seismic data stream for offloading, based on the one or more seismic receiver domain attributes.

14. The system of claim 11, wherein the quality control data comprise one or more seismic attributes of the respective seismic sensor data and associated timing information, the one or more seismic attributes selected from first break peak, amplitude calibration of the hydrophone, amplitude calibration of the geophone, shear wave leakage attenuation, pressure-velocity summation and seismic receiver domain attributes, and first break information characterizing one or more seismic impulses observed by the respective seismic sensors.

15. The system of claim 11, wherein the seismic receivers comprise autonomous seismic nodes each having a seismic sensor subarray comprising a hydrophone and a multi-axis geophone, wherein the clock, the local controller and the local memory are provided individually for each autonomous seismic node, distinct from others of the autonomous seismic nodes.

16. The system of claim 11, wherein the local controllers are configured to prioritize a subset of the respective seismic data stream for offloading based on a list of discrete time records generated from the respective quality control data, seismic sensor data and associated timing information.

17. The system of claim 16, wherein the quality control data comprise metadata selected to generate first break information indicative of one or more seismic impulses in the seismic sensor data corresponding to the discrete time records.

18. The system of claim 17, wherein one or more of:
the selected portions of the seismic data stream are recorded in the respective local memory in response to the first break information indicating one or more such seismic impulses, and
other portions of the seismic data stream are excluded from recording in the respective local memory absent the first break information indicating one or more such seismic impulses.

19. The system of claim 17, wherein the local controllers are configured for the respective seismic receivers to operate in a standby mode absent the first break information indicating one or more such seismic impulses within a preselected time window.

20. The system of claim 11, further comprising a seismic survey controller configured for retrieving the seismic data streams from the seismic receivers and a survey data store configured for storing seismic imaging data generated thereby.

21. The system of claim 20, further comprising one or more of:
a display system configured for displaying the seismic imaging data, wherein the displayed seismic imaging data characterize subsurface geophysical structures in the survey area;
a survey process optimizer configured to receive state completion information from the seismic receivers, the state completion information indicative of the quality control data being generated in the seismic data streams;
a survey mapper configured to update survey state data in the survey data store based on the state completion information, wherein the seismic survey controller is configured to prioritize a subset of the seismic receivers for retrieving the seismic data streams, based on the survey state data; and
the seismic survey controller configured to update a display of the seismic imaging data based on the seismic data streams retrieved from the prioritized subset of seismic receivers, prior to complete retrieval of all the seismic data streams from each seismic receiver.

22. An autonomous seismic node apparatus comprising:
a seismic sensor subarray comprising a hydrophone and a multi-axis geophone configured for acquiring seismic sensor data characterizing a seismic wavefield proximate the seismic node, when deployed in a seismic survey;
a local clock configured for associating the seismic sensor data with timing information;
a node controller on the autonomous seismic node, the node controller configured for generating a seismic data stream including the seismic sensor data and associated timing information in combination with quality control data generated therefrom; and
local memory on the autonomous seismic node, the local memory configured for recording at least selected portions of the seismic data stream based on the quality control data.

23. The apparatus of claim 22, wherein the quality control data comprise one or more receiver domain attributes generated by the node controller based on the respective seismic sensor data and associated timing information, the one or more receiver domain attributes comprising first break peak information indicative of one or more seismic impulses observed by the respective seismic sensor subarray.

24. The apparatus of claim 22, wherein the node controller is configured to:
record the selected portions of the seismic data stream in the local memory responsive to the first break peak information indicating the seismic impulse and to exclude other portions of the seismic data stream from storage in the local memory absent the first break peak information indicating the seismic impulse; or prioritize the selected portions of the seismic data stream for offloading via a data link in communication with the plurality of autonomous seismic nodes, the data link comprising one or more of a data bus, an ocean-bottom cable, a wireless data link and an acoustic data link.

25. The apparatus of claim 22, wherein the quality control data comprise:

metadata used to create a list of discrete time records associated with the selected portions of the seismic data stream that are prioritized for retrieval from the local memory; or one or more seismic attributes based on the seismic sensor data and associated timing information, the one or more seismic attributes selected from amplitude calibration of the hydrophone, amplitude calibration of the geophone, shear wave leakage attenuation and pressure-velocity summation of the seismic sensor data.

* * * * *